United States Patent [19]

Tashiro et al.

[11] Patent Number: 4,596,013

[45] Date of Patent: Jun. 17, 1986

[54] DATA TRANSMISSION NETWORK

[75] Inventors: Korefumi Tashiro, Hitachi; Kunio Saito, Katsuta; Hiroshi Takenaga, Hitachi; Masahiro Yasunami, Katsuta, all of Japan

[73] Assignee: Hitachi, Ltd., Tokyo, Japan

[21] Appl. No.: 460,557

[22] Filed: Jan. 24, 1983

[30] Foreign Application Priority Data

Jan. 26, 1982 [JP] Japan ...................................... 57-9463

[51] Int. Cl.⁴ ........................... H04J 3/00; H04J 3/02; H04Q 3/00
[52] U.S. Cl. ......................................... 370/86; 370/85; 340/825.05
[58] Field of Search ....................... 370/86, 89, 90, 60, 370/97; 340/825.05

[56] References Cited

U.S. PATENT DOCUMENTS

| | | | |
|---|---|---|---|
| 3,483,329 | 12/1969 | Hunkins et al. | 370/86 |
| 3,569,632 | 3/1971 | Berensin et al. | 370/86 |
| 3,639,904 | 2/1972 | Arulpragasam | 370/86 |
| 3,781,815 | 12/1973 | Boudreau et al. | 370/86 |
| 3,855,422 | 12/1974 | Cadiou et al. | 370/86 |
| 3,919,484 | 11/1975 | Maxemchuk | 370/86 |
| 4,277,843 | 7/1981 | Duquenne et al. | 370/89 |

OTHER PUBLICATIONS

"VME Module GPIB Controller with DMA", Motorola VME Modules, 1982.

Primary Examiner—Douglas W. Olms
Assistant Examiner—Wellington Chin
Attorney, Agent, or Firm—Antonelli, Terry & Wands

[57] ABSTRACT

The invention discloses a data transmission network having a plurality of data transmission stations connected through a loop-like transmission line for mutual data transmission, wherein a plurality of data frames, each having data packets allocated to the respective stations, are circulated through the transmission line simultaneously, and each station is arranged to send out the data frame to the transmission line immediately after renewing the data of the data packet allocated to that station in the received data frame, and to process the data of the received data frame to be used for the associated equipment after sending out the data frame.

7 Claims, 8 Drawing Figures

DATA TRANSMISSION NETWORK

BACKGROUND OF THE INVENTION

This invention relates to a data transmission network, and more particularly to a data transmission network which is adapted for data transmission among many groups of equipment for which real time control is required.

In transportation equipment, such as railway vehicles, ships or airplanes, nuclear power plants, chemical plants, steel plant or a building system associated with elevators and devices for safety, there is provided various equipment which is collectively controlled.

In order to electrically connect such equipment, multi-wire cables or coaxial cables have been used. However, such a system becomes more complicated year by year as the system is provided with more improved functions, resulting in requirement of more increased electrical connections. It is difficult to satisfy the requirement by increasing the number of cables connecting the equipment, because of the cost, weight and space for mounting the cables and also because of restriction in reconstruction of the electrical connections.

For example, in a train composed of plural vehicles, most of the control signals are sent from the driver's compartment to various equipment mounted on the vehicles. Therefore, many through-wires are provided in parallel from the driver's compartment and pass through the vehicles and control signals are distributed to desired equipment through the wires.

It is also usual, in such a train system, to divide the whole system into a plurality of units, each unit including two to four vehicles and the control functions are provided in each unit. In this case, it is required to provide, in addition to the above-mentioned through-wires, a plurality of unit wires which interconnect the equipment of each unit.

Thus, the number of wirings needed for the vehicles was considerably increased and especially with recent progress of vehicle control, it has much increased and it is not unusual nowadays that the wirings provided through the vehicles comprise more than 300 lines. Furthermore, in order to perform intelligent driving of a train which includes monitoring the condition of each equipment, it is expected that more than several hundreds of signal exchanges are necessary. The conventional system has a problem in excessively increased weight, space, and mounting cost for wirings in the vehicles.

One of the methods of reducing the number of wirings to as small a number as possible and enabling the transmission of many signals is a time division multiplex transmission network.

However, many of the time division multiplex transmission networks which have been put to practical use have a problem in that the transmission time varies greatly depending on the quantity of transmitted data, and hence such systems are not applicable to the control of equipment in the vehicles which are required to send and/or receive control signals in a real time mode.

Namely, the control of various equipment such as the drive control of vehicles has been designed on the condition that the individual control signals are transmitted through respective separate wires. In such a separate wiring system, there is no necessity of considering the time delay required for signal transmission and therefore the delay time for signal transmission has been neglected in the design of the control system.

Therefore, the multiplex communication network, in which the signal transmission time may vary greatly, cannot ensure a satisfactory operation in the train control.

A packet exchange system which is broadly used for telephone exchange or multi-purpose communication is one of the known time multiplex communication networks in which the variation of transmission time is very small.

However, like other conventional time mutliplex transmission networks, the packet exchange system has also a problem in that it generally requires provision or a high technical quality for its transmission stations, as well as peripheral devices, resulting in high cost and wider space for mounting the system.

SUMMARY OF THE INVENTION

An object of this invention is to eliminate the above-mentioned defects of prior art systems and provide a data transmission network, which can transmit the signals required for control of associated equipment in the time multiplex mode without any substantial time delay which may adversely affect the control necessary for required operation. This network may be applicable to a system which performs real time control, such as the exchange of control signals for various purposes among various groups of equipment in railway vehicles, etc.

According to the present invention, the above object is achieved by a data transmission network comprising a plurality of data transmission stations provided, respectively, to a plurality of groups of equipment to be controlled, each station being provided with an input-output unit for the corresponding group; a transmission path which connects the stations in a loop; means for circularly transmitting a plurality of data frames of the same bit length simultaneously in the transmission path, each data frame including a plurality of data packets allocated to the respective stations; and a data processing unit provided to each station and arranged to receive and store the data frame when it arrives, and then to renew a data packet in the data frame allocated to the station if required and to send out this data frame to the transmission path immediately The processing unit is also arranged, after sending out the data frame, to read out the contents in predetermined locations of the stored data frame alloted to the station to be used for controlling the associated equipment.

In the data transmission network of this invention as arranged in this manner, since each station sends out the received data frame immediately after the data frame is stored and a data packet allocated for the station is renewed, the time delay required for each station to send out each data frame is reduced to a very small value which is almost negligible for the real time control of the system. Furthermore, since a plurality of data frames are transmitted simultaneously through the transmission line, the amount of processed information can be increased easily.

Usually, a control signal used for real time control of the system is a 1-bit signal such as an ON-OFF signal. Therefore, even if the length of each data frame is relatively short, many control signals can be transmitted. If a long message as well as ON-OFF signals are to be transmitted, one or more of the plurality of data packets allocated to each station may be used for sending the message. If the message is too long to be carried on one packet, the message may be divided into two or more sections to be carried on two or more packets. Alternatively, a virtual packet may be provided in one or more data frames so that, if the packet is vacant, any station can occupy it. The message can be transmitted by using this packet. Contrary to the control signal, since the message may be transmitted with a certain time delay, there exists no problem in sending the message in the above manner.

In signal tranmission of the type involved in train control, there exist various modes such as a 1 to N type in which one signal derived from the driver's cabinet is received by many equipment or a 1 to 1 type in which one signal is received by one particular equipment. In the multiplex transmission of vehicle signals, therefore, it is required to be capable of multi-addressing transmission in which any transmission station can receive any desired signal. According to this invention, the multi-addressing communication can be performed very easily.

BRIEF DESCRIPTION OF THE DRAWINGS

The present invention will be understood from the following description of embodiments with reference to the accompanying drawings, in which.

DESCRIPTION OF THE PREFERRED EMBODIMENT

Figure 1:
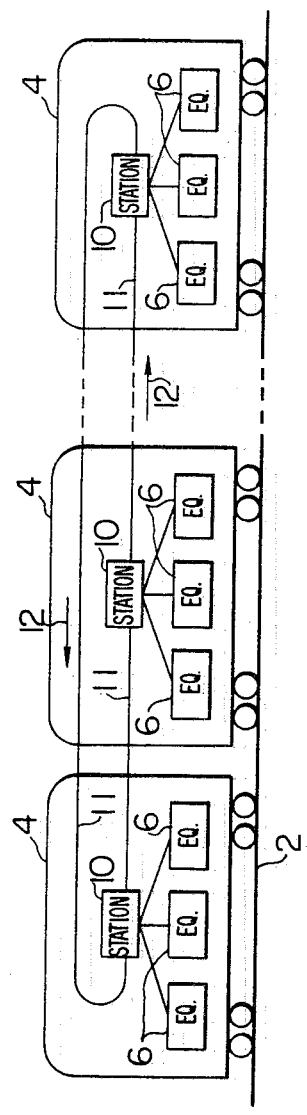
FIG. 1 is a schematic diagram of the data transmission network of this invention when applied to a train control system.
Figure 2:
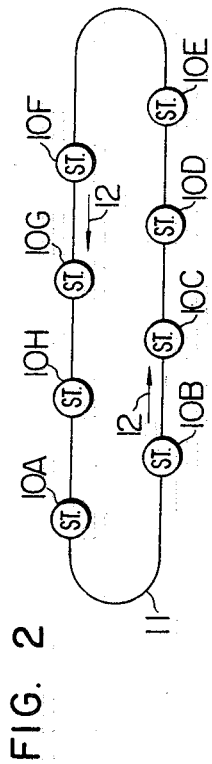
FIG. 2 is a diagram showing the connection of the stations and the transmission line.
Figure 4:
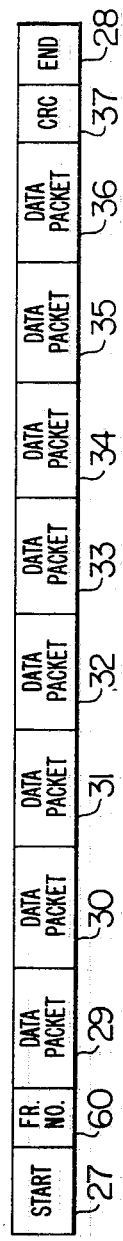
FIG. 4 is a diagram showing the basic constitution of a data frame used in this invention.

As one example, explanation will be made of a case where the data transmission network of this invention is applied to a train control system. In FIGS. 1, 4 denotes vehicles, 2 a rail, and 10 data transmission stations provided in the vehicles. The stations are connected in a loop through a transmission line 11. Data frames are circularly transmitted through the transmission line 11 in the direction of an arrow 12. FIG. 2 depicts only the stations and the transmission line of FIG. 1. The stations are designated sequentially by 10A, 10B, . . . 10H.

Figure 3:
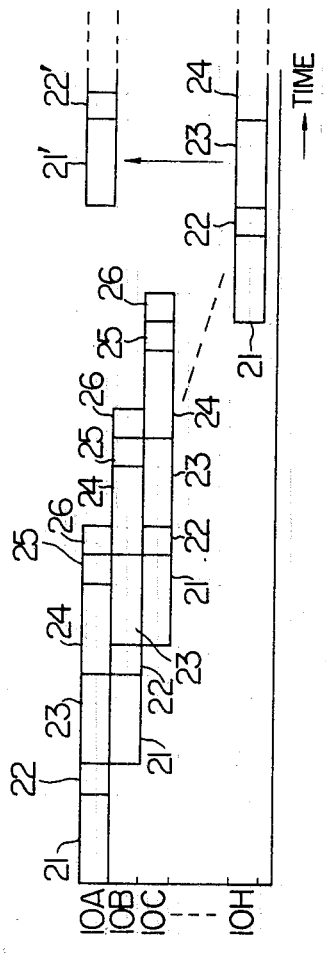
FIG. 3 is a diagram showing the temporal relation in operation of the stations.

As will be explained later, a plurality of data frames are circulated in series on the transmission line. Each data frame is processed in the stations 10A to 10H, sequentially, at timings as shown in FIG. 3. In this figure, 21 denotes a process in which the data frame is received and recorded at each station, 22 a process in which a data packet of the received data frame allocated to the station is renewed, if required, and 23 a process in which the data frame is sent out to the transmission line. Since the propagation time on the transmission line is negligible, the process 23 for sending-out the data frame from each station occurs at the same timing as the process 21 in which the next station receives the data frame. After the station sends out a data frame, it fetches selectively control signals related to the station out of the data frame stored at the process 24 and damps the control signals to the associated equipment. Then, new data is introduced from the associated equipment at a process 25. At the next process 26, a preset operation is carried out to make the station ready for receiving the next data frame. 21' and 22' show the process in which the data frame is again received and renewed, respectively, at each station after the data frame has been sent out from the same station and circulated through the transmission line. Although not shown, in a time interval between 26 and 21', other data frames simultaneously circulating through the transmission line are received and processed by the station. Therefore, how many data frames can be simultaneously circulated depends on the time interval between the processes 26 and 21' and also on the time required for each station to receive and process each data frame.

FIG. 4 shows an example of the data frame. In this figure, 27 denotes a start flag, 28 an end flag, 60 a frame number code, 29 to 36 data packets allocated to the stations 10A to 10H, respectively, and 37 a frame check code for error detection.

In each station, the data to be sent out to other stations is written into the data packet allocated to the sending station. As described above, since each control signal used for the real time control is a 1-bit signal such as an ON-OFF signal and it is previously known which equipment of which station uses the respective control signals, it is possible to preliminarily determine the station at which each bit of each data packet is read out and the equipment which is controlled by the read-out bit signal. Therefore, in the process 24, each station fetches only those bit signals which are assigned for that station in the data packets allocated to other stations.

Next, explanation will be made of the basic operation of the above embodiment.

We assume that the station 10A and the packet 29 are allocated to the first vehicle having a driver's compartment of a train respectively and that other stations 10B to 10H and packets 30 to 36 are allocated to the other vehicles, respectively.

After starting the train power source, the station 10A monitors that no data frame arrives at that station for a predetermined period of time and then sends out a predetermined number of data frames as shown in FIG. 4, sequentially, at a predetermined time interval into the transmission line.

The station 10A writes into the packet 29 of each data frame a pattern of signals derived from the equipment associated with the first vehicle and leaves the other packets vacant.

The station 10B receives each data frame sent out by the station 10A. After receiving the data frame, the station 10B writes in the packet 30 of the data frame signals derived from the equipment associated with its own station and sends out the data frame without changing the contents of the other packets.

Each station carries out a similar operation, whereby each data frame sent out from the station 10A is continuously circulated through the transmission line, while the contents of the respective data packets thereof are renewed, respectively, by signals derived from the corresponding equipment mounted on the train.

In this case, a transmission delay occurs only at the receiving process 21 and the data-rewriting process 22 in each station, as shown in FIG. 3. Other processes 23 to 26 are performed during a time interval before receiving the next data frame. Thus, the circulation time of each data frame is short and always constant.

Furthermore, since the equipment mounted on the train is generally manufactured by many independent companies separately, it is important to simplify the procedure for using the transmission line in the time-shared multiplex mode, thereby preventing possible errors and restricting the increased functions required for the different equipment. According to the above arrangement of the data frame, the procedure can be greatly simplified because the bits of the data packets are allocated correspondingly to the respective signals for the equipment mounted on the train.

This is the basic principle of the present invention in transmitting ON-OFF signals for operating devices such as switches for controlling the associated equipment.

Next, explanation will be made of a case of transmitting a message consisting of a long data series in addition to 1-bit signals, such as ON-OFF signals.

We assume that a packet 70 is allocated to the station 10H and that a message is transferred from the station 10H to the station 10E.

As described above, the data packet 70 may be one of the data packets allocated to the respective stations, or a virtual packet provided in a certain data frame. An address field may be provided in the data packet for a message to specify a station to which the message is sent, so that only the specified station receives the message and processes it.

Figure 5:
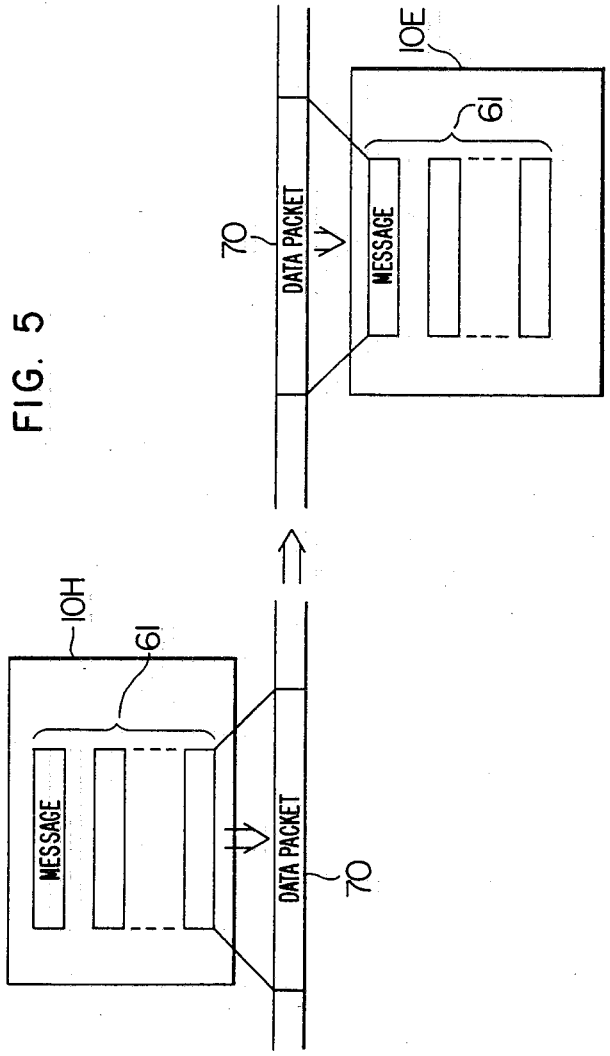
FIG. 5 is a schematic diagram used for explanation of the operation of the stations in message transmission.

In FIG. 5, 61 denotes a message prepared by the station 10H or its associated equipment.

In the station 10H, the message 61 is divided into several units each unit having a length corresponding to each data packet 70, and sent out by loading the units, sequentially, on the packet 70 of the data frame, every time the data frame reaches the station 10H after circulating arount the transmission line.

In the station 10E, if the message in the data packet 70 is determined to be directed to that station, the content in the packet 70 is read out and stored each time the data frame reaches the station 10E. Then, the message 61 is reconstructed by assembling the stored contents, i.e., the respective units of the message.

Figure 6:
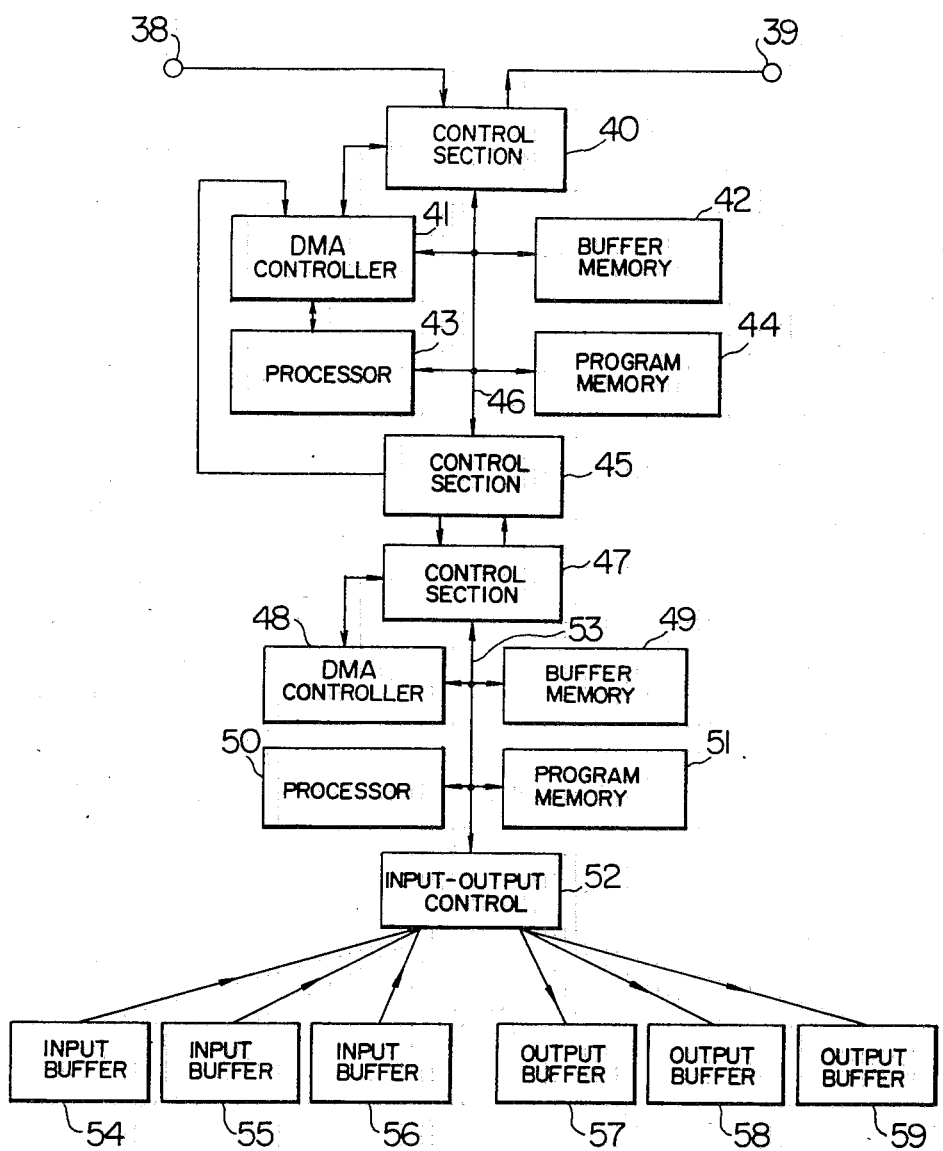
FIG. 6 is a block diagram showing the circuit connection of each station.

Explanation will be made of the construction and the operation of each station with reference to FIGS. 6 and 7. In FIG. 6, 38 is a receiving terminal; 39 a sending terminal; 40, 45 and 47 communication control sections; 41 and 48 direct memory access (DMA) controllers; 42 and 49 buffer memories; 43 and 50 processors; 44 and 51 program memories; 46 and 57 busses; 52 an input-output control section; 54 to 56 input buffers; and 57 to 59 output buffers.

Upon starting the operation, a specific one of the stations, which is predetermined to initially issue data frames, sends out a predetermined number of data frames, sequentially to the transmission line by means of the communication control section 40 and the buffer memory 42 and then is rendered ready for receiving the data frame arriving at the receiving terminal 38 thereof, while the other stations are rendered, immediately upon starting the operation, ready for receiving the data frames arriving at the receiving terminals thereof. In any station, when the data frame arrives, the communication control section 40 receives and stores the contents of the data frame in series from the transmission line through the receiving terminal 38. The control section 40 is also arranged to detect the start flag 27 and check the frame code sequence (FCS) by using the frame check code. The result of FCS check is recorded in a specific register. In the DMA controller 41, a control instruction is written preliminarily by the processor 43. The control instruction is executed in response to the detection of the start flag 27 by the control section 40. According to the control instruction, the procesor 43 temporarily stops its operation and the contents of the data frame stored in the control section 40 are transferred into the buffer 42 in parallel. To this end, the control instruction designates a first address of the area of the buffer 42 in which the contents of the data frame are to be written and specifies the quantity of bytes to be written. The quantity of bytes corresponds to the length of the data frame which is constant. When the DMA controller 41 detects that the specified quantity of bytes have been written into the buffer 42, it sends a signal to the communication control section 40. Then, if the result of the previous FCS check indicates that the received data frame is valid, the communication control section 40 issues an interuption request to the processor 43. If the result of the FCS check indicates that the received data frame is invalid, the data frame is cancelled. Immediately thereafter, a preset operation is effected to make the station ready for receiving the next data frame. In this case, the station 10A may be arranged to detect that one data frame is cancelled, and issue a new data frame. The processor 43 detects the interruption request, and executes the following process in accordance with a program stored in the program memory 44.

(1) Reading out of the data frame stored in the buffer memory 42, the contents of a packet allocated to the receiving station and storing them in a different area of the buffer memory 42 (i.e. a memory area for the data which has been issued from that station and received after one circulation through the transmission line).

(2) Renewing the contents of the above packet by output signals of predetermined associated equipment which are previously stored in the processor 43 through the output control section 52.

(3) Presetting into the DMA controller 41 the head address of the area of the buffer memory 42, where the received data frame is to be stored, and the number of bytes to be transferred (the number of words of the data frame).

(4) Driving the communication control section 40, which in turn drives the DMA controller 41 and transmits all the contents of the data frame stored in the buffer memory 42 and including the renewed packet of the station in accordance with the preset information.

(5) After the data frame has been transmitted, transferring the contents of the data frame stored in the buffer memory 42 into the lower buffer memory 49, while the contents of the data packet of that station in the transferred data frame are replaced by the before-renewal contents which have been stored in the different area of the buffer memory 42.

(6) Applying an interrupt request to the processor 50, to start the data processing, as mentioned hereinafter, concerned with the station in accordance with a predetermined program.

(7) Presetting the communication control part 40 and the DMA controller 41 (the preset 26 in FIG. 5) to be ready for receiving the next data frame.

Thus, the station completes the processes for receiving, renewing and transmitting one data frame and gets ready for receiving the next data frame. The processing of the received data concerned with the receiving station will be briefly explained, although it is not essential for the present invention.

The processor 50 compares the contents of the data packet allocated to the receiving station in the data frame, previously transferred to the buffer memory 49, with the contents of the data packet which was existing in the data frame when it was sent out from the station and stored in a different area of the buffer memory 49. If they coincide with each other, it is judged that the data frame received at this time is valid. Then, bit signals are selectively read out of the locations allocated to the control signals for the associated equipment and applied to the equipment through the input-output control section 52 and the output buffers 57 to 59. Next, output signals of predetermined associated equipment, which should be transmitted to other stations from that station, are fetched through the input buffers 54 to 56 and the input output control section 52.

The processor 50 is holding, till then, the contents of the data packet allocated to the station in the data frame which has been just sent out. Those contents of the data packet are now transferred to the different area of the buffer memory 49, and new contents to be used for the data packet which should be sent out at the next time are prepared by using the output signals of the associated equipment which have been fetched previously, and transferred to the processor 43. The data which has been transferred to the different area of the buffer memory 49 is used for the comparison check when the data frame just sent out returns to that station after one circulation through the transmission line. Furthermore, the contents which have been transferred to the processor 43 are used as the data to be sent out at the next time.

As described above, according to the arrangement of the stations and the transmission procedure, the transmission control process and the process for input-output signals for the equipment control are carried out separately by two processors. Therefore, the transmission control process is simplified and can be completed in a constant short time. Moreover, each station can receive desired data in the data frame without affecting the processes of the other stations and also can perform readily the multiaddressing communication as described before.

As the components shown in FIG. 6 can be arranged in a well-known manner, no detailed explanation will be necessary. For example, the DMA controllers can be made of an IC chip, HD 46504 made by Hitachi Ltd. in Japan. Other components can also be realized by one or several IC chips. Therefore, the size and the power consumption of the transmission station can be made small so that it is enough to provide the train with a small space for accommodating each station.

Next, the transmission efficiency of the above basic construction will be described.

Now, we assume that the total length of the sum of the packets in one frame is 512 bits; the transmission speed on the loop is 2M bits/sec and the processing time for data renewal is 50 $\mu$sec. Then, the delay time at one station is about 0.32 m sec.

In a case where such a station is mounted on each vehicle of an eight-vehicle train and the information generated by one station is transmitted to the farthest station, that is, the next station on the upstream side in the transmission line, the delay time is minimum when the data frame carrying the information is sent out from the station immediately after the information is generated at that station. Thus, the minimum delay time is $0.32 \times 7 = 2.24$ m sec.

On the other hand, the delay time is maximum when the data frame has been sent out from the station just before the information is generated. In such a case, the station should wait until the data frame circulates on the loop transmission line and returns to the station. The maximum delay time is then $0.32 \times (7+8) = 4.80$ m sec. Thus, the variation of signal transmission time is within a range of $3.52 \pm 1.28$ m sec.

Most of signal conversion elements used in the equipment of a train are usually relays and electromagnetic valves whose response time is usually 10 to 50 m sec. Therefore, the above range in variation of the transmission time is practically negligible.

According to the above-mentioned transmission network for use with vehicles, 512-signal transmission, which may be difficult to be realized by the prior art system using through-vehicle wires, can be realized by using only one data frame not only with satisfactory performance, but also with an additional capacity for transmitting information for monitoring the conditions of the equipment in the vehicles.

A passenger train is often composed of 16 vehicles. In such a case, 20 stations may be necessary; two in the first and last trains, one in each middle vehicle and two for automatic test from outside. Since the delay time increases in proportion to the number of transmission stations, the effective propagation time would be too long if a very long data frame were used.

Thus, in this invention, the necessary whole frame length is divided into a plurality of short lengths of data frames, which are simultaneously circulated through the transmission line.

Figure 8:
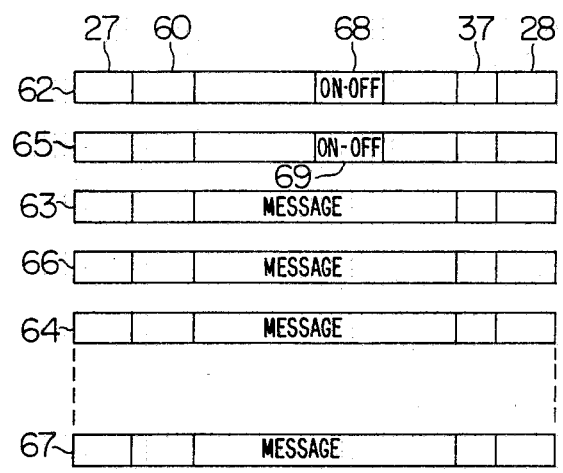
FIG. 8 is a diagram showing the constitution of data frames having message packets.

FIG. 8 shows an example in arrangement of a group of data frames according to this invention. In this figure, 62 to 64 denote date frames composed of data packets for sending 1-bit control signals such as ON-OFF signals, and 65 to 67 denote data frames composed of data packets for message transmission. The same number of packets of both kinds are allocated to each station on the loop, and the lengths of the packets are equal to each other.

In the example of FIG. 8, 68 and 69 correspond to packets for ON-OFF signals and message, respectively.

The station which initially generates the data frames assigns to each data frame a frame number 60 in the order of generating. Before the first frame returns to the original station after circulation through the loop transmission line, all the data frames are generated.

Figure 7:
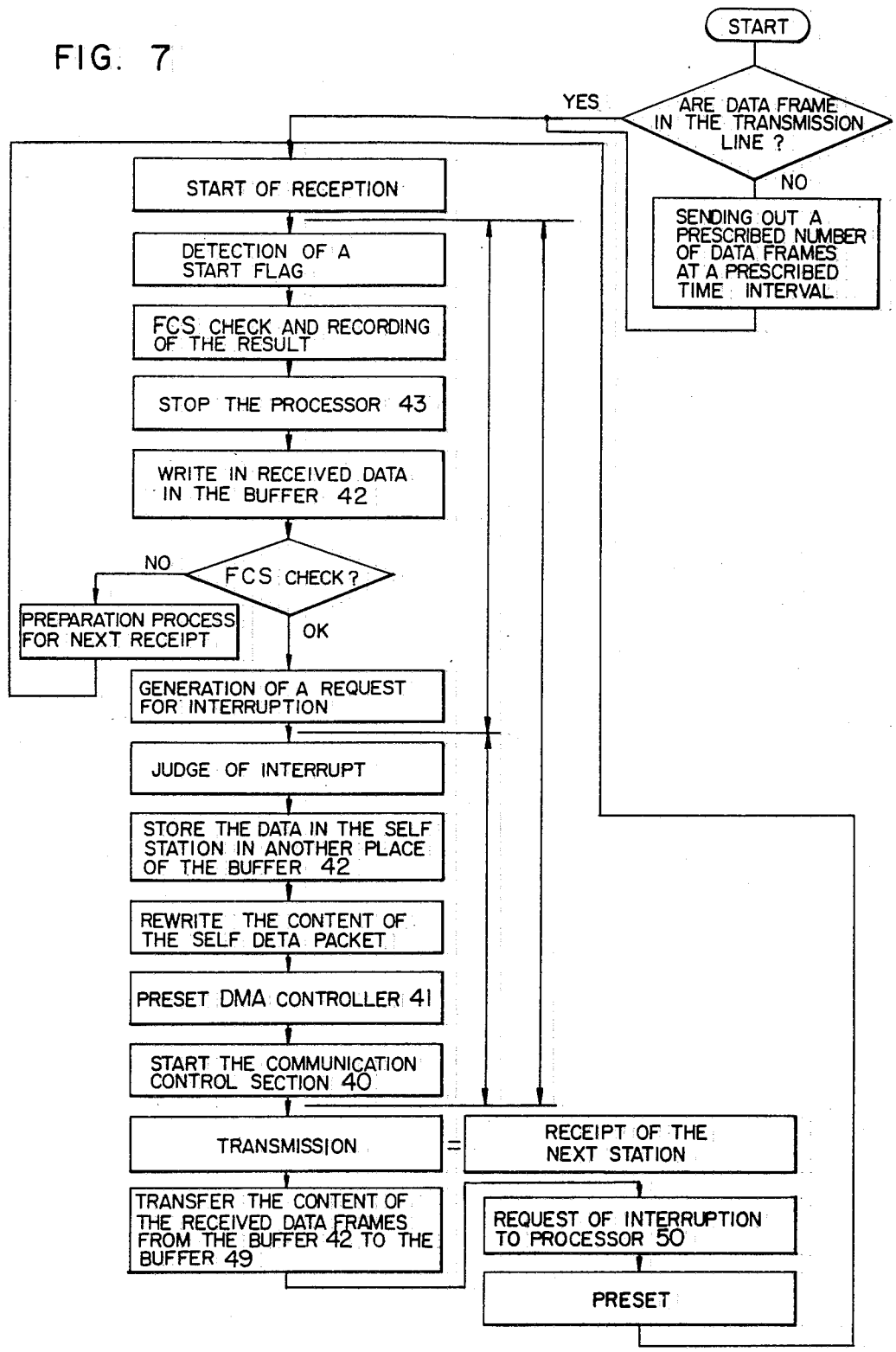
FIG. 7 is a flow chart in process for data transmissoin in each station.

As seen from the above-mentioned explanation with reference to FIG. 7, the time delay required for each station to receive one data frame is shortened by decreasing the length of the data frame. Then, the circulation speed of the data frame on the loop can be increased.

Furthermore, in a preferred embodiment of this invention, the lengths of packets allocated to one station are the same independent of the kind of packets, the renewal of the contents at the transmission control section can be done in the same procedure and hence it is not necessary for the transmission control section to discriminate the type of the contents. Thus, all the data frames can be circulated on the loop at constant speed and constant intervals. This makes the transmission of message and that of ON-OFF signals compatible.

A hardware for achieving such data transmission can be realized by the construction as shown in FIG. 6. It is needless to say that no change of hardware such as change in the number of data frames and data packets is required.

In the above embodiment, it is assumed that at the start of operation, a specific one, e.g. the station 10A, of the stations initially generates data frames. Therefore, if trouble occurs in the station 10A, the initial generation of data frames cannot be effected, resulting in failure of operation of the transmission network.

In order to avoid this, it is desired to provide each of two or more stations with a function of generating data frames when no data frame is received for a predetermined time interval after the start of operation. The time intervals for the respective stations are determined to be progressively longer one by one, thereby to determine the order of the stations to effect the function such that if the first station having the shortest time interval fails to generate the data frames the next station having the next shortest time interval effects the function in place of the first station and so on.

In this manner, even if the station associated with the driver's compartment has trouble and cannot drive the train, it is possible to transmit those signals which are required for controlling the system of room illumination, air conditioner, broadcasting or the like thereby continuing certain service for passengers and increasing reliability.

The station as shown in FIG. 6 is provided with a processor 50 for processing the input and output signals of the associated equipment, independently of the processor 43 for the transmission control. Therefore, the processor 50 can perform the process of information for the equipment in the vehicles having this station. As a result, the intelligence in processing of the train information can be increased according to the development of such train information. Furthermore, real time transmission as well as signal transmission service for non-intelligent equipment can be performed, while decreasing the quantity of information to be transmitted.

Although the present invention has been explained with reference to an example applied to a signal transmission system of a train, the data transmission network of this invention is not limited to the embodiment. It may be applied to signal transmission systems in various transportation apparatus, industrial plants and buildings.

As explained above, according to this invention, the transmission delay time can be decreased and kept at a constant value even when used with a digital multiplex communication.

Therefore, it is possible to eliminate the shortcomings of the prior art and to give the following advantages when applied to a signal transmission system for railway vehicles or the like:

(1) high transmission speed;
(2) low cost and small size and weight;
(3) capability of multiple-addressing communication; and
(4) high reliability and readiness in extension of system.

Further, since the hardware of each station can be made in the same manner, the maintenance of the data transmission network can be simplified and the manufacturing cost can be reduced.

What is claimed is:

1. A data transmission network in which a plurality of data transmission stations are connected by a loop-like transmission line for mutual data transmission; said network comprising means for generating sequentially a plurality of data frames having the same length so that said plurality of data frames continuously circulate on said transmission line simultaneously, with the circulation time for each data frame being constant, each data frame having plural data packets fixedly allocated to respective ones of said data transmission stations; means provided in each of said data transmission stations for receiving and storing the data frame from said transmission line, for modifying the received data frame only by replacing the contents of the data packet thereof allocated to its own station and for sending out the modified data frame to said transmission line, so that each data packet has written therein only data from the station to which that packet is allocated; and means for selectively reading out and processing the data to be used for its own station out of any data packet of said stored data frame after sending out said modified data frame.

2. A data transmission network according to claim 1, wherein said frame generating means is provided in a specific one of the stations and includes means for generating and sending out, at the starting of operation, a predetermined number of said data frames to said transmission line.

3. A data transmission network a plurality of data transmission stations are connected by a loop-like transmission line for mutual data transmission; said network comprising means for generating sequentially a plurality of data frames having the same length so that said plurality of data frames circulate on said transmission line simultaneously, each data frame having plural data packets fixedly allocated to said data transmission stations, respectively; means provided in each of said data transmission stations for receiving and storing the data frame from said transmission line, for modifying the received data frame by replacing the contents of the data packet thereof allocated to its own station and for sending out the modified data frame to said transmission line; and means for selectively reading out and processing the data to be used for its own station out of said stored data frame after sending out said modified data frame, said frame generating means being provided in each of at least two of said stations and including means for generating and sending out said data frames if no data frame is received by the station having said frame generating means for a predetermined time interval after start of the operation, said time interval determined for one of said means being different from that for the other means.

4. A data transmission network according to claim 1, wherein each of the data packets provided in the data frames is used exclusively for transmitting a predetermined one of a plurality of different kinds of data.

5. A data transmission network according to claim 4, wherein all of the data packets have the same length and all data packets of a given data frame are used for transmitting the same kind of data.

6. A data transmission network according to claim 1, wherein said means for receiving and transmitting data frames is provided with a transmission control section, a processor, a direct memory access controller and a buffer memory, said transmission control section including means for receiving said data frame transmitted via said transmission line and for driving said direct memory access controller to transfer directly the received data frame to said buffer memory and to replace the contents of a predetermined portion said buffer memory by said received data frame, and said processor operates after the reception of said data frame has been completed to cause said transmission control section to drive said direct memory access controller to send out the contents of said buffer memory.

7. A data transmission network according to claim 6, wherein said means for selectively reading out and processing the data comprises means for reading out the data to be used for equipment associated with the own station from the received data frame and applying said data to said equipment, and means for transmitting the data generated from said equipment to said processor.

* * * * *